June 20, 1933.  P. B. RENFREW  1,915,103
APPARATUS FOR WINDING FILTER RIBBON
Filed Nov. 5, 1928   5 Sheets-Sheet 2
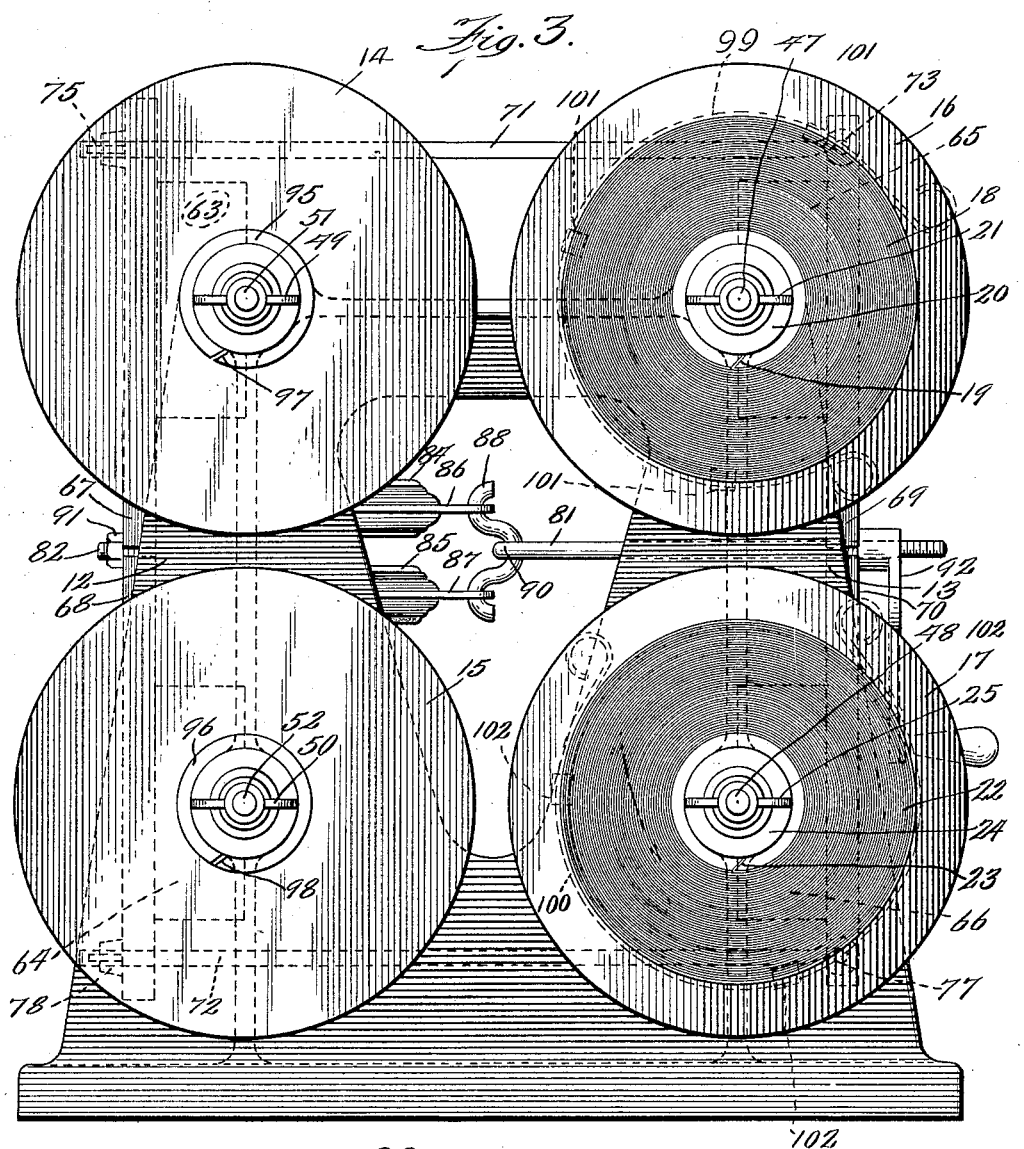
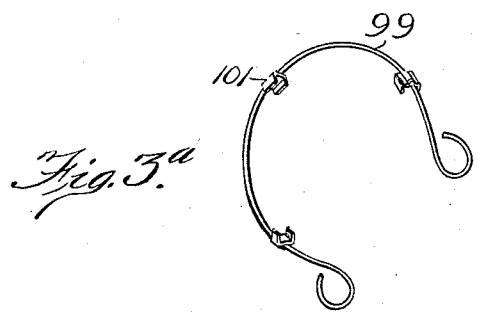

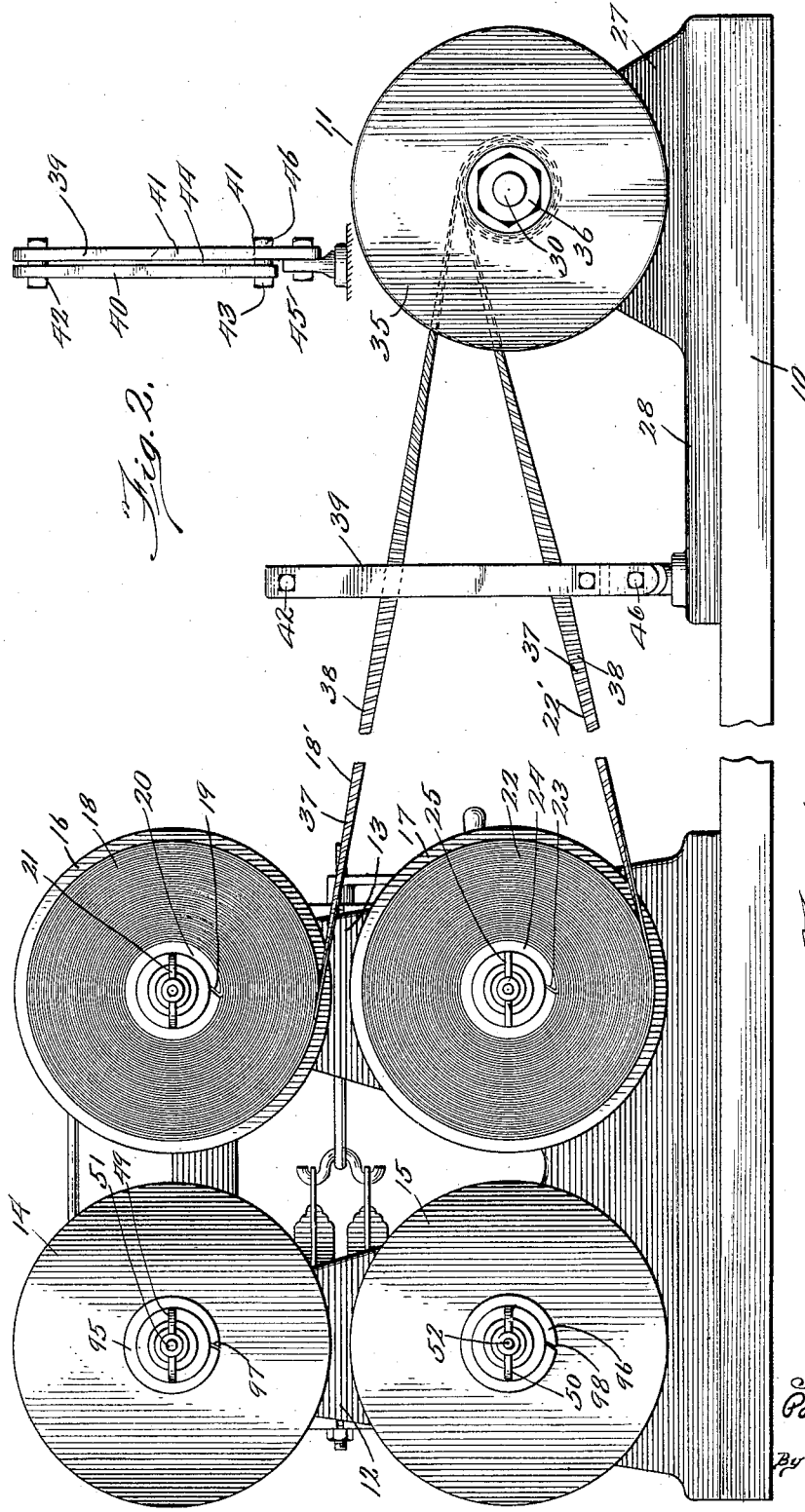

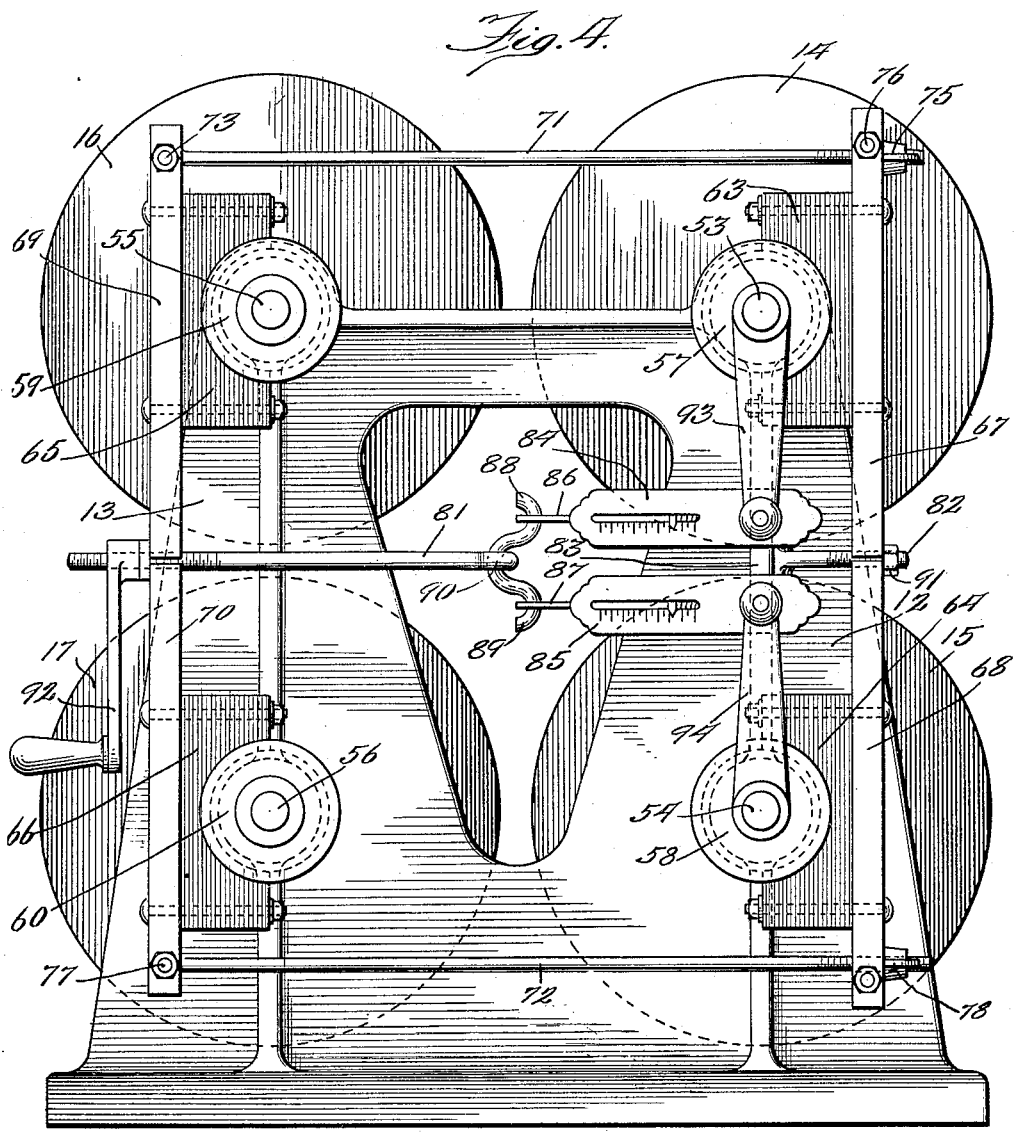

June 20, 1933.  P. B. RENFREW  1,915,103
APPARATUS FOR WINDING FILTER RIBBON
Filed Nov. 5, 1928  5 Sheets-Sheet 4
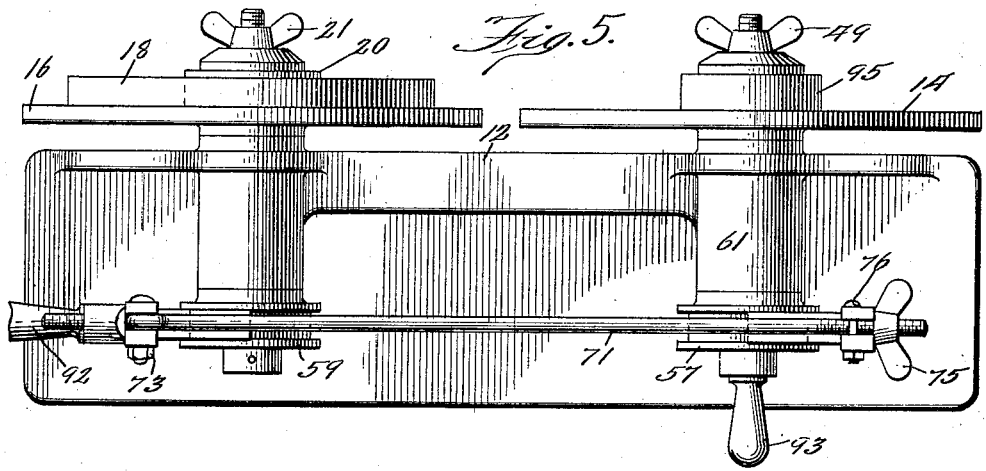
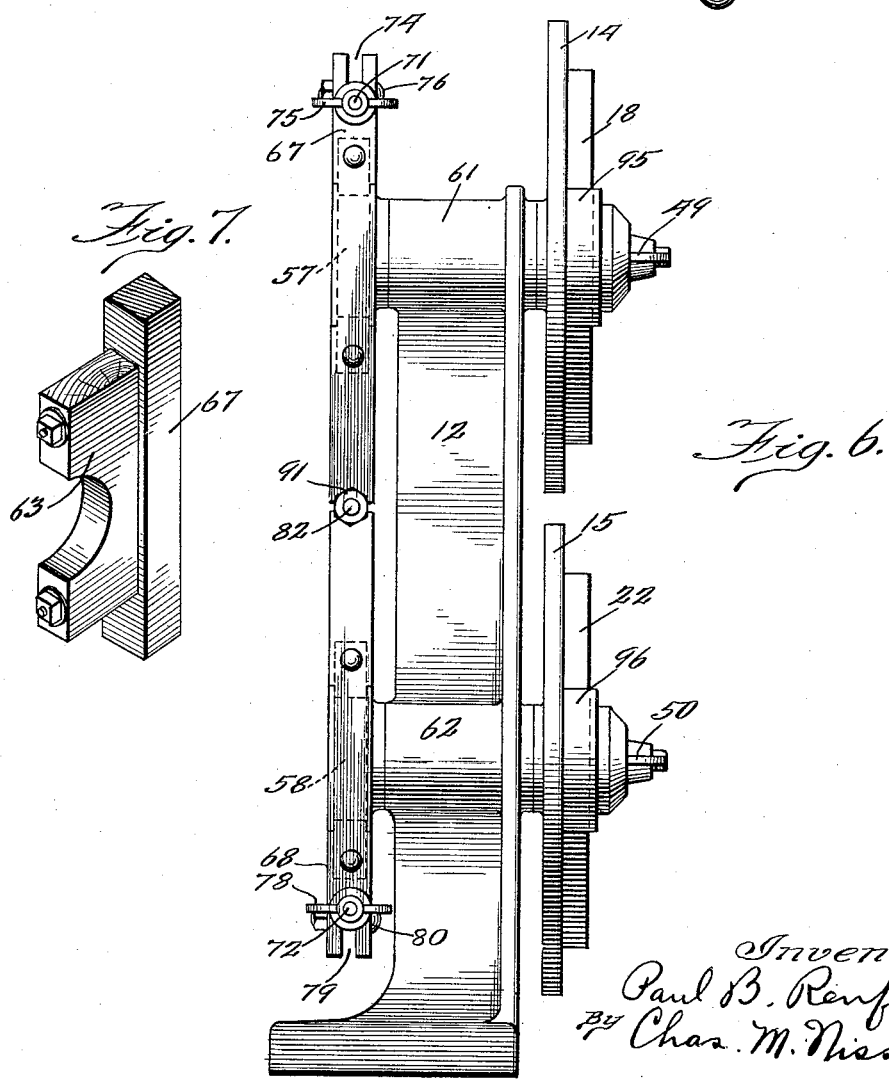

June 20, 1933.  P. B. RENFREW  1,915,103
APPARATUS FOR WINDING FILTER RIBBON
Filed Nov. 5, 1928  5 Sheets-Sheet 5
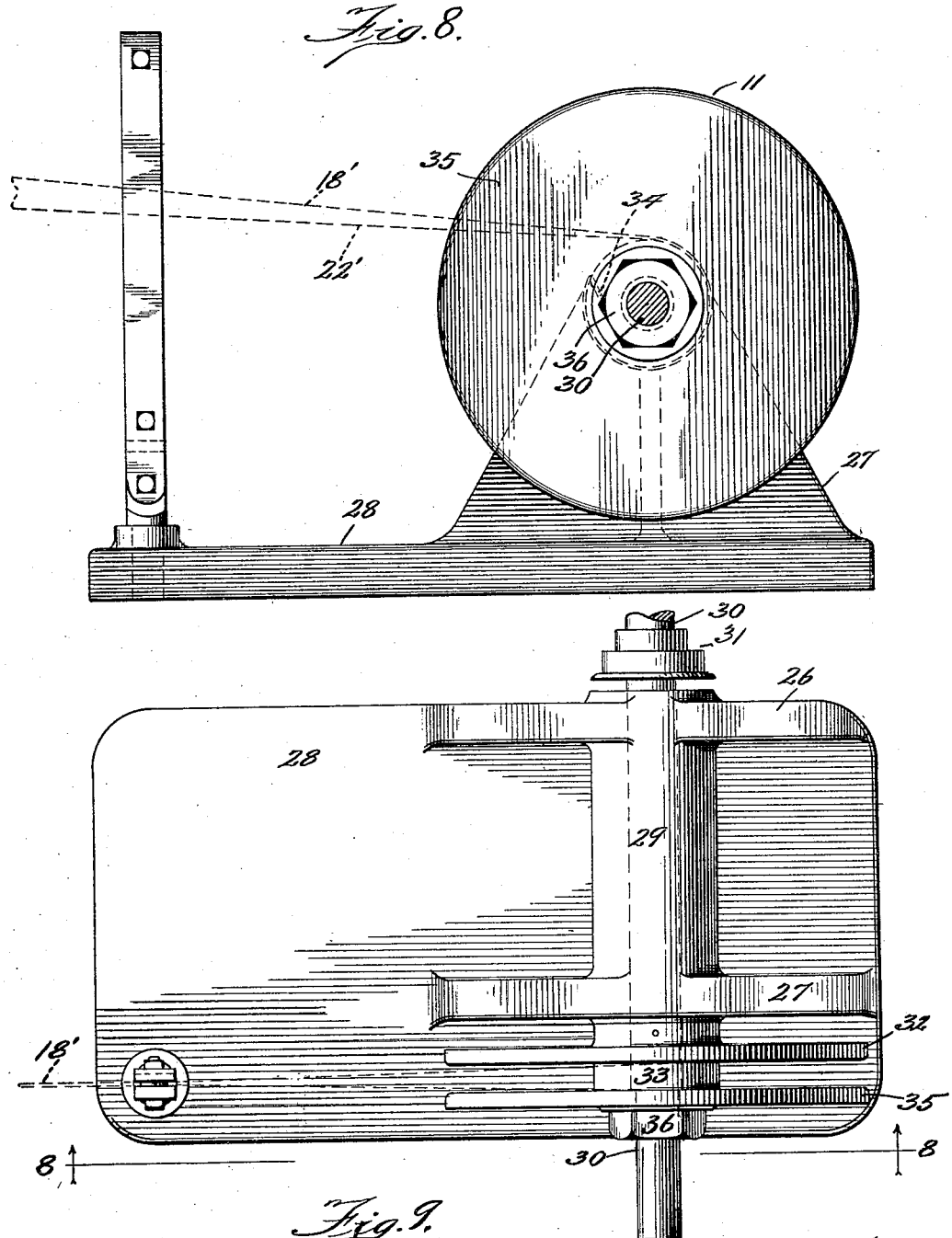

Patented June 20, 1933

1,915,103

UNITED STATES PATENT OFFICE

PAUL B. RENFREW, OF FORT WAYNE, INDIANA, ASSIGNOR TO S. F. BOWSER & COMPANY, INC., OF FORT WAYNE, INDIANA, A CORPORATION OF INDIANA

APPARATUS FOR WINDING FILTER RIBBON

Application filed November 5, 1928. Serial No. 317,344.

My invention relates to apparatus for winding filter ribbon and although it is particularly adapted for this purpose, it should be understood that it may have a general application.

One of the objects of my invention is the provision of improved and efficient apparatus for winding filter ribbon into flat disc filter elements adapted for use in filtering apparatus requiring hydraulic pressure for its operation.

Another object of my invention is the provision of mechanism for winding ribbon onto a reel wthout abrading the edges of such ribbon while being wound.

A further object of my invention is the provision of deflecting mechanism for directing ribbon onto a reel so as to wind the same into a disc filter element without injury to the edges of the ribbon.

Another object of my invention is the provision of improved and efficient means for regulating the tension on ribbon being wound.

A further object of my invention is the provision of improved means for winding a plurality of ribbons simultaneously into a disc to form a filter element.

Another object of my invention is the provision of means for indicating the retardation applied to a paying out reel to regulate the tension of ribbon being wound into a disc.

Other objects will appear hereinafter, the novel features and combinations being set forth in the appended claims.

In the accompanying drawings—

Fig. 1 is an elevational view of ribbon winding mechanism embodying my improvements;

Fig. 2 is an elevation of the ribbon deflector shown in Fig. 1;

Fig. 3 is an elevational view of one side of the paying out reel; Fig. 3ª illustrates a spring clip for preventing wound ribbon from unwinding;

Fig. 4 is an elevation of the other side of the structure shown in Fig. 3;

Fig. 5 is a plan view of the structure shown in Fig. 4;

Fig. 6 is an end elevation of the structure shown in Fig. 3;

Fig. 7 is a perspective view of one of the brake shoes of the ribbon tension regulating mechanism;

Fig. 8 is an elevational view of the ribbon deflector and the winding reel and is taken on the line 8—8, looking in the direction of the arrows; and Fig. 9 is a plan view of the structure shown in Fig. 8.

Referring to Fig. 1, 10 designates a bed plate on the forward end of which is mounted the winding reel 11. On the rear portion of the bed plate 10 on standards 12 and 13 are mounted the paying out reels 14, 15 and 16, 17.

Clamped to the paying out reel 16 is a disc 18 of prepared metal filter ribbon, the inner end of which is connected at 19 to the hub 20, the latter being clamped by means of the thumb-nut 21 to the flat roll or reel 16. In a similar manner, the lower paying out reel 17 carries the roll 22 of wound prepared metal filter ribbon, the inner end of which is connected at 23 to the hub 24. By means of the thumb-nut 25 the hub 24 is secured to the flat disc or reel 17.

As shown in Figs. 1, 8 and 9, the winding reel 11 is mounted on spaced-apart standards 26, 27 on the auxiliary bed plate 28. Journaled in the bearing 29 supported at the upper ends of the standards 26 and 27 is a driving shaft 30 which may carry pulleys 31 of varying diameter so that the shaft may be driven at various speeds.

The disc 32 of the winding reel 11 is permanently secured to the driving shaft 30 and is provided with a hub 33 with a slot 34 therein to receive the ends of the ribbons 18' and 22'.

Spaced from the disc 32 is another disc 35 which is detachably secured to the hub 33 by means of the nut 36. The disc 35 and the nut 36 may be removed from the end of the shaft 30 so as to permit removal of the hub 33 together with the disc of filter ribbon wound thereon. It will thus be seen that while the disc 32 is permanently secured to the shaft 30, the hub 33, the disc 35 and the nut 36 are clamped to the disc 32 to rotate therewith, but the nut 36 may be clamped with just sufficient tightness to assure slipping if the tension on the ribbons being wound exceeds a predetermined amount. However, when the tension regulating mechanism is used as hereinafter explained, the nut 36 may be very securely tightened so as to cause the reel comprising the discs 32 and 35 to be positively driven so long as the ribbon is being wound.

It is highly desirable to wind the ribbon on the winding reel 11 very tightly so as to secure a very compact filter disc element with a maximum number of minute pores or channels distributed over a given area between the flat faces of the disc. The ribbons 18' and 22' are of thin metal, such as copper or other metal of sufficient strength to permit tight winding without undue distortion, compression or stretching. Cross-ribs or cross-bars 37 are integral with the body of the ribbon being formed by compressing the metal into spaced-apart grooves or channels by indentations 38.

While copper is preferable of which the tape or ribbon is composed, it may be of other material, such as tantalum, according to the nature of the liquid to be filtered, tantalum being very useful to resist oxidation. Copper has been found suitable, however, for filtration of oils such as used on engine bearings.

The thickness of the metal ribbon or tape and the depth of the grooves or transverse channels may be varied according to conditions and the nature of the liquid to be filtered. It has been found practicable in filtering lubricating oil to use copper ribbons three-eighths of an inch in width and thirty-six four ten-thousandths of an inch in thickness with the cross-ribs thereon four ten-thousandths of an inch thick and spaced-apart to form grooves or channels four ten-thousandths of an inch in depth and one-eighth of an inch in width, leaving the cross-ribs approximately one-sixteenth of an inch in width. In other words, the metal ribbon may initially be four-thousandths of an inch thick and indented with grooves four ten-thousandths of an inch in depth, leaving the thickness of the metal at the bottom of the grooves thirty-six ten-thousandths of an inch and the thickness of the metal at the cross-ribs four-thousandths of an inch. I do not wish to be limited to these particular dimensions, however, but they are specified to illustrate the fact that the porous metal disc element formed by winding on the winding reel 11 is intended to have such minute passageways between the flat faces thereof as to require hydraulic pressure to effect filtration.

Inasmuch as it is highly desirable to wind the filter ribbon into a compact disc uniform in thickness or with faces in parallel planes with the channels uniform in cross-section from the entrance side of the disc element to the discharge side thereof, the ribbon should be wound so as to be laid in convolutions on the reel 11 without abrasion of the edges of the filter ribbon. For this purpose I have provided a deflector 39 mounted on the rear end of the auxiliary bed plate 28 and consisting of vertical members 40 and 41 of fiber, wood, or other relatively soft material clamped together at 42 and 43 to leave a slot 44 for the passage of the filter ribbon. The lower end of the wooden member 41 may be pivoted at 45 and clamped in adjusted position by means of the nut 46.

The vertical slot 44 being in a vertical plane twists the filter ribbon 38 into a vertical plane, as shown in Fig. 1, and therefore turns the edges of the ribbon away from the inner opposing faces of the discs 32 and 35 of the winding reel 11. The ribbon 18' is therefore laid down on the convolutions on the hub 33 of the winding reel without being abraded by the rotating faces of the discs 32 and 35. In the same manner, the lower ribbon 22' may extend through the same slot 44 of the deflector 39 and be wound simultaneously on the hub 33 with the ribbon 18'. The ribbons 18' and 22' are each deflected with their edges adjacent the discs 16 and 17 extending upwardly, thereby avoiding any tendency for the ribbon to slip from the convolutions on the discs 18 and 22. The deflector 39 is preferably composed of fiber, wood, or some other material softer than the material of which the ribbons 18' and 22' is composed so that there will be no abrasion of the cross-bars 37 on the filter ribbons 18' and 22'.

It should also be noted that the edges of the ribbons 18' and 22' that are laid down on the hub 33 tend to move compactly toward the inner face of the disc 35 so as to be securely laid against the latter without any tendency to slip from the convolutions on the hub 33 when the latter together with the disc 35 are removed from the disc 32 by removing the nut 36 and slipping the hub 33 off the shaft 30.

I will now describe the mechanism for regulating the tension of the filter ribbons 18' and 22' while being wound on the reel 11. By referring to Fig. 3 it will be seen that the reels 16 and 17 are respectively secured to shafts journaled in bearings in the standard 13. In a similar manner, additional reels 14 and 15 are secured to shafts which are journaled in the standard 12. The clamps 21 and 25 are respectively screw-threaded to the screw-threaded supports 47 and 48 secured to the centers of the discs 16 and 17. In a similar manner, the clamps 49 and 50 are mounted on the screw-threaded supports 51 and 52 at the left-hand portion of Fig. 3. It should be particularly understood that the shafts which are journaled in bearings in the standards 12 and 13 are on the rear sides of the discs 14, 15, 16 and 17, as viewed in Fig. 3. Fig. 4 being a rear elevation of the structure shown in Fig. 3, shows the shafts for the reels 14, 15, 16 and 17 respectively at 53, 54, 55 and 56. Secured to the shafts 53, 54, 55 and 56 and therefore rigidly connected to the discs 14, 15, 16 and 17 are the brake pulleys 57, 58, 59 and 60 respectively. These brake pulleys are grooved as shown at 57 and 59 in Fig. 5, which is a plan view of the structure shown in Fig. 4.

As shown in Fig. 6, which is an end elevation of Fig. 3, 61 designates the bearing at the upper end of the standard 12 for the shaft 53 of the disc 14 and 62 designates the bearing for the shaft 54 of the disc 15.

Associated with the brake pulleys 57, 58, 59 and 60 are the brake shoes 63, 64, 65 and 66 respectively, as shown in Fig. 4. The brake shoes 63 and 64 are bolted respectively to the brake levers 67 and 68 and the brake shoes 65 and 66 are bolted respectively to the brake levers 69 and 70. A tie-rod 71 connects the upper ends of the brake levers 67 and 69 and a tie-rod 72 connects the lower ends of the brake levers 68 and 70. The tie-rod 71 is pivoted at 73 to the upper end of the brake lever 69 and its other end is extended through a slot 74 in the upper end of the brake lever 67, as shown in Fig. 6. By means of the wing-nut 75 fitting on the screw-threaded end of the tie-rod 71 the distance between the upper ends of the brake levers 67 and 69 may be adjusted. The tie-rod 71 may be held in the slot 74 by means of the bolt 76. In a similar manner, the tie-rod 72 is pivoted at 77 at the lower end of the brake lever 70 and its other end is screw-threaded to receive the wing-nut 78. The rod 72 fits in a slot 79 as shown in Fig. 6 and may be held in such slot by means of the bolt 80.

The adjacent ends of the brake levers 69 and 70 are provided with semi-circular transverse grooves to receive the connecting rod 81 and in a similar manner the adjacent ends of the brake levers 67 and 68 are provided with semi-circular grooves to receive the connecting rod 82. The inner end of the rod 82 is provided with a cross-piece 83 to which are connected the frames of the weighing scales 84 and 85. The movable elements 86 and 87 in these scales are connected to the hooks 88 and 89 which are connected to the hook 90 at the inner end of the connecting rod 81. A nut 91 on the rod 82 abuts against the adjacent ends of the brake levers 67 and 68. A crank 92 is screw-threaded onto the outer end of the connecting rod 81 and bears against the adjacent ends of the brake levers 69 and 70. It will thus be seen that by turning the crank 92 or by turning the nut 91 the brake shoes 63, 64, 65 and 66 may be applied to the brake pulleys 57, 58, 59 and 60 with varying degrees of pressure, as indicated by the pointers on the scales 84 and 85. In this manner the retardation to the paying out of the filter ribbon from the wound discs 18 and 22 may be varied to regulate the winding tension on the ribbons 18′ and 22′ during operation of the winding apparatus.

It will also be seen that the brake shoes are so interconnected that they will be applied with substantially equal force on all of the brake pulleys and therefore effect substantially the same braking effect on each paying out reel. Therefore, when a plurality of reels of intended tape such as those designated 18 and 22 in Fig. 1 are substantially of the same diameter and composed of ribbon of the same size, equal tension may be applied to the two ribbons 18′ and 22′ while being wound onto the winding reel 11. With the apparatus shown, one, two, three or four ribbons may be wound simultaneously on the winding reel 11.

While I prefer to wind the ribbon on the winding rell 11 by means of power connected to the driving shaft 30 and use the deflector as shown in Fig. 1 to secure automatic winding operation without abrasion of the edges of the ribbon and while maintaining the cross-channels or grooves uniform in cross-section from one face of the disc filter element to the other, I have provided cranks 93 and 94 connected respectively to the shafts 53 and 54 so as to be able to operate the reels 14 and 15 individually and manually. Hubs 95 and 96 may be placed on the discs 14 and 15 respectively and clamped to the latter by means of the thumb-nuts 49 and 50, as shown in Figs. 1 and 3. By placing the free end of the ribbon 18′ in the slot 97 in the drum 95 and using the crank 93 to turn the disc 14 in a clockwise direction as viewed in Fig. 1, the ribbon 18′ may be unwound from the disc 18 onto the disc 14, care being exercised not to let the inner edge of the ribbon come in contact with the face of the disc 14. This may readily be done since the operation is manual. The brake shoes would be applied to the brake pulleys of both the reel 16 and the reel 14 and therefore the ribbon would be held taut between the discs 16 and 14 at all times whether the crank 93 is being turned or not. In the same manner, the free end of the ribbon 22' may be inserted into the slot 98 on the drum 96 and the disc 15 wound in a clockwise direction, as viewed in Fig. 1, by turning the crank 94 shown in Fig. 4. In this way the smooth surfaces of the ribbons may be laid down so as to face toward the axis of rotation of the winding reels which are manually operated. Such manual operation may be used when power is not available for operating the reel 11.

Such manual operation may also be used for testing purposes to regulate the degree of application of the brake shoes and consequently the tension applied to the ribbons while winding the same so as to secure the desired compactness of the convolutions in a filter disc element that is particularly adapted for use in filtering apparatus requiring hydraulic pressure for its operation. I have shown, described and claimed such filter element and means for operating the same by hydraulic pressure in my co-pending application, Serial No. 289,150, filed June 29, 1928, for an Improvement in filters. In my co-pending application, Serial No. 317,343 filed November 5, 1928, for an Improvement in machine for manufacturing filter ribbon, I have shown, described and claimed apparatus for indenting filter ribbon and winding the same into discs such as those shown at 18 and 22 in Fig. 3 mounted on hubs 20 and 24. For the purpose of transportation, suitable circular clamps may be employed consisting of U-shaped pieces of spring wire 99 and 100 with spaced-apart clips 101 and 102 thereon to engage the peripheries of the discs 18 and 22 to keep them from unwinding. When these discs are placed on the reels 16 and 17, care should be exercised to maintain the free ends of the ribbons taut with sufficient tension to prevent unwinding when the spring-retaining devices are removed.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In a machine for winding filter ribbon, the combination with a winding reel, of a plurality of paying out reels, means for driving said winding reel, means for passing said filter ribbon simultaneously from the paying-out reels and winding them in superimposed positions on the winding reel, brake mechanism for said paying out reels to effect tautness of the ribbon while being wound, and a deflector for said ribbons to bend them into planes extending transversely of the axis of said winding reel, and for preventing the edges of said ribbons from contacting with said winding reel.

2. In a machine for winding filter ribbon, the combination with a winding reel, of a drive shaft therefor, a plate for holding the wound ribbon on said reel, a plurality of paying out reels, a deflecting device having a slot for bending the ribbon into a plane extending transversely of the axis of said winding reel to enable said ribbon to enter between the face of said winding reel and said plate without touching either of them, and brake mechanism associated with said paying out reels to effect tautness of the ribbon while being wound.

3. In a machine for winding metallic filter ribbon, the combination with a winding reel a pay-out reel, of an upright stationary device having a surface to be engaged by the ribbon to bend the same into a vertical plane to effect the laying down of the ribbon on the convolutions of the ribbon on the reel without abrasion of the edges of the ribbon against the reel, and means for driving the reel to wind the same and effect such deflection of the ribbon.

4. In a machine for winding filter ribbon, the combination with a winding reel, of a paying out reel, a brake for said paying out reel to keep the ribbon taut while being wound, and a device for deflecting the ribbon into a plane at right angles to the axis of the winding reel to direct the ribbon onto the convolutions of ribbon on said winding reel while the edges of the ribbon remain out of contact with said winding reel.

5. In automatic apparatus for winding filter ribbon, the combination with a winding reel, of a plurality of paying out reels, means for driving said winding reel to wind ribbons while pulling the same from said paying out reels, and a deflector having a deflecting surface in position to be engaged by spaced-apart ribbons to deflect the same into a plane substantially at right angles to the axis of said winding reel to direct all of the ribbons onto said winding reel automatically without abrasion of the edges by engagement with said winding reel.

6. In a machine for winding filter ribbon, the combination with a winding reel comprising a flat-faced disc, of an additional disc for holding in place the convolutions of ribbon on said reel, and an adjustable deflector mounted in position to deflect the ribbon into a plane at right angles to the axis of the reel to effect a laying of the ribbon on the convolutions between said discs without abrasion of the edges of the ribbon against the faces of either of said discs.

7. In a machine for winding filter ribbon, the combination with a reel comprising spaced-part discs and an intermediate drum, of a device for deflecting the ribbon into a plane extending transversely of the axis of said reel to cause said ribbon to be wound on said drum without abrasion with the opposite inner faces of said discs, said deflecting device being composed of softer material than the ribbon to prevent abrasion of the ribbon while being deflected into such plane, and means for driving the reel to wind the ribbon on said drum while the ribbon is being thus deflected.

8. In a machine for winding metallic filter ribbon, the combination of a winding reel, and a deflector pivotally mounted about an axis parallel to the axis of rotation of the reel for adjustment toward and from said reel in position to deflect ribbon into a transverse plane before it travels onto said reel.

9. In apparatus for winding filter ribbon, the combination with a winding reel, of a plurality of paying out reels, equalized braking mechanism applied to the paying out reels, means for simultaneously adjusting the tension of said braking mechanism, and means for deflecting the ribbons into planes extending transversely of the axis of the winding reel while the winding reel is being operated to pull the ribbons from said paying out reels against the action of said braking mechanism.

10. In a device of the class described, the combination of a receiving reel and paying-off reels all disposed in a common plane and in spaced-apart relation, of means for simultaneously passing metallic filter ribbon from the paying-off reels directly on to the receiving reel in superimposed position, and means also mounted in said common plane and maintained out of contact with the longitudinal edges of said ribbons and preventing said edges from contacting with the receiving reel during the winding operation.

11. An apparatus for winding very thin metallic ribbon comprising the combination of a winding reel, means for rotating said winding reel, four paying-out reels, a brake for each paying-out reel, common means for simultaneously applying the brakes equally on each of said paying-out reels to regulate the ribbon winding tension, and means for indicating the brake pressure applied to said paying-out reels, said paying reels and winding reel being constructed and arranged to permit the simultaneous winding of ribbons from certain of said paying-out reels onto said winding reel in superimposed relation.

12. An apparatus for winding very thin metallic ribbon comprising the combination of a winding reel, means for rotating said winding reel, four paying-out reels, a brake for each paying-out reel, common means for simultaneously applying the brakes equally on each of said paying-out reels to regulate the ribbon winding tension, and means for indicating the brake pressure applied to said paying-out reels, said paying reels and winding reel being constructed and arranged to permit the simultaneous winding of ribbons from certain of said paying-out reels onto said winding reel in superimposed relation, two of said paying-out reels being provided with driving means whereby ribbons may be alternately wound from two of said paying-out reels onto two other of said paying-out reels.

13. In apparatus for winding very thin metallic ribbon onto a disc so as to provide superimposed laminations providing microscopic passages therebetween, the combination of a winding reel and at least three paying-out reels, means for driving the winding reel, means for simultaneously winding ribbons under a predetermined pressure from at least two of said paying-out reels in flat superimposed relation onto the winding reel, the third paying-out reel having means for driving the same whereby ribbon from one or more of the other paying-out reels may be wound under predetermined pressure onto the third paying-out reel.

14. In apparatus for winding very thin metallic filter ribbon into disc-like form to provide a laminated filter having microscopic filtering openings between the laminations comprising the combination of a winding reel, means for rotating the same, a paying-out reel spaced therefrom, means for unwinding a coil of ribbon wound on the paying-out reel and passing it in a straight-line path of travel directly onto the winding reel, means for regulating the winding tension on the ribbon, and means for turning the ribbon angularly about its axis of travel as it passes from the paying-out reel to the winding reel whereby to prevent the edge of the ribbon contacting with the winding reel for preventing the abrading of the ribbon edges.

15. In apparatus for winding very thin metallic filter ribbon into disc-like form to provide a laminated filter having microscopic filtering openings between the laminations comprising the combination of a winding reel, means for rotating the same, a paying-out reel spaced therefrom, means for unwinding a coil of ribbon wound on the paying-out reel and passing it in a straight-line path of travel directly onto the winding reel, means for regulating the winding tension on the ribbon, and means for turning the ribbon on its axis through an angle of substantially 90 degrees in its passage from the paying-out reel to the winding reel, whereby to prevent the scraping of the edges of the ribbon against the winding reel.

16. In metallic ribbon winding mechanism for forming disc filters comprising the combination with a winding reel, a paying-off reel and a deflector all arranged in spaced apart relation in a common plane with the deflector between the paying-off reel and the winding reel, of means for mounting a coil of metallic ribbon on the paying-off reel, means for attaching the free end thereof to the winding reel, means for driving the winding reel, said deflector comprising spaced-apart members leaving a slot between the same, and means for passing the ribbon through the slot of the deflector, said deflector being positioned to twist the ribbon into a transverse plane to facilitate the winding of the same on said reel.

In testimony whereof I have signed my name to this specification on this 30 day of October A. D. 1928.

PAUL B. RENFREW.